O. W. NOTTINGHAM.
HEATER.
APPLICATION FILED JUNE 11, 1919.

1,355,249.

Patented Oct. 12, 1920.

Inventor
Otis W. Nottingham.

Attorney

UNITED STATES PATENT OFFICE.

OTIS W. NOTTINGHAM, OF INDIANAPOLIS, INDIANA.

HEATER.

1,355,249.          Specification of Letters Patent.          Patented Oct. 12, 1920.

Application filed June 11, 1919. Serial No. 303,278.

*To all whom it may concern:*

Be it known that I, OTIS W. NOTTINGHAM, a citizen of the United States, residing at Indianapolis, in the county of Marion and State of Indiana, have invented certain new and useful Improvements in Heaters, of which the following is a specification.

My said invention relates to "hot plates" designed especially as a part of automobile supplies, but adapted for a large variety of purposes. While the primary purpose is to provide a heating apparatus whereby tourists may readily provide a fire for heating and cooking, yet it is equally serviceable in many other places as in hospitals, as part of a general camping outfit, and may likewise be employed for providing heat for small rooms, as bathrooms, etc., when the regular heating apparatus is not available. By making my device of sufficient size and with sufficient surface to radiate the heat, it may be used for heating larger rooms.

The object of my said invention is, therefore, to provide a heating apparatus of the character referred to which will be comparatively inexpensive and convenient to carry and at the same time efficient for a large variety of purposes, all as will be hereinafter more fully described and claimed.

Figure 1:
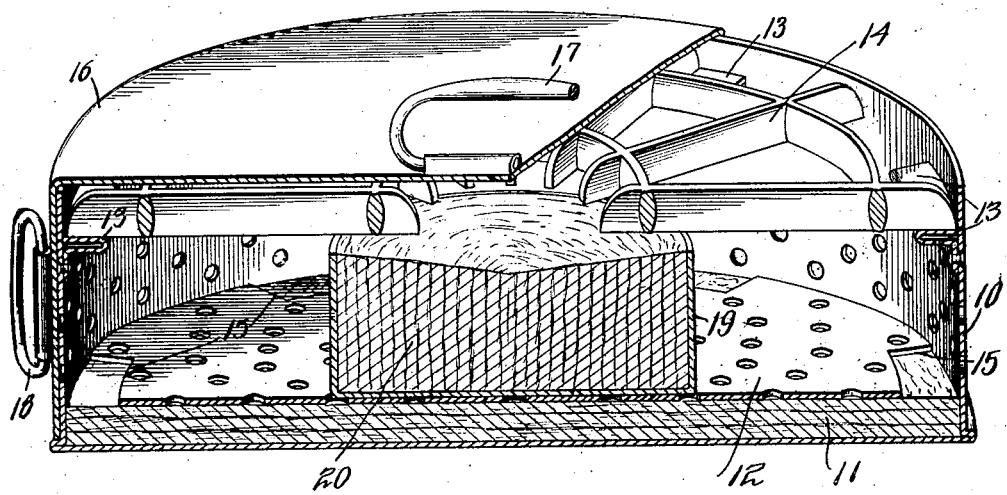
Figure 2:
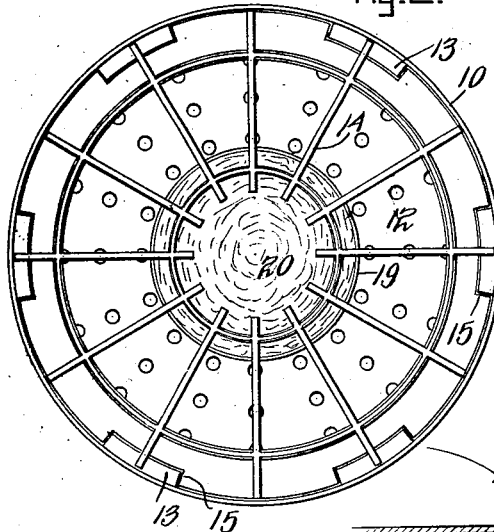
Figure 3:
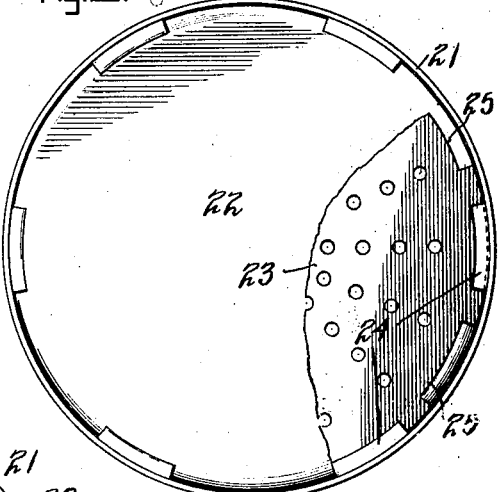
Figure 4:
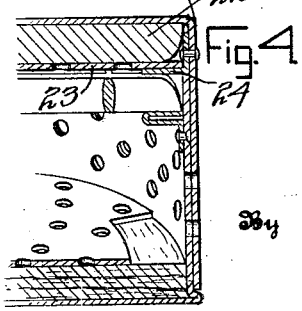

Referring to the accompanying drawings which are made a part hereof and on which similar reference characters indicate similar parts, Figure 1 is a cross section through one of the devices in perspective constructed in accordance with my said invention, Fig. 2, a top plan view with the lid removed, Fig. 3, an under side view of a modified type of lid, and Fig. 4, a sectional view showing a fragment of the device provided with a lid of the type shown in Fig. 3.

Said device consists of a main casing 10 preferably circular in form, having an imperforate bottom and perforated sides. In the bottom of said casing is mounted one or more layers of an absorbent and non-heat-conducting substance 11, such as asbestos. On top of said asbestos, or other non-heat-conducting substance, is mounted a perforated plate 12, preferably of aluminum. On the sides of the casing 10 near the top are provided a series of brackets 13 on which is supported a removable grate 14. The plate 12 is preferably formed with notches 15 in its edges adapted to pass over the brackets 13 when put in position.

The substance 11 serves to protect the bottom of the housing and underlying supporting members or structures from the heat generated by the ignited fuel and also serves to absorb and hold any fluid spilled thereon, while the plate 12 protects the substance 11 from damage and, by reason of the perforations, permits the spilled fuel to be ignited and consumed.

The lid 16 shown in Fig. 1 is adapted to fit tightly over the casing 10 and is provided with a handle 17 on its top and with handles 18 on its sides, for the purpose of manipulating the lid, also for the purpose of handling the device as a whole.

A burner comprising a casing 19 filled with asbestos, or other absorbent non-combustible material 20, is mounted in the casing 10. Said casing 19 is likewise preferably circular in form and the filling 20 is wound tightly into a circular mass and fitted within said casing. The top of said filler is preferably formed dish-shaped, or in the form of an inverted cone, to provide a concavity adapted to hold a quantity of fuel while it is being absorbed into the filler 20 without overflowing the sides. These burners are preferably provided in various sizes, several being provided with each heater, in order to provide for varying needs, and at the same time economize in the use of the fuel as by such means only the fuel needed for the particular purpose is used. I usually find that about three sizes are desirable, a smaller size when only a small fire or small quantity of heat is required or needed, the next larger size when a larger fire is required, and the largest when the full capacity is needed for the service desired.

In Figs. 3 and 4 I have shown a lid 21 similar to the one shown in Fig. 1 except its sides are perforated and in the top is mounted a soapstone filler 22 adapted to retain the heat. Said soapstone filler is supported on a perforated aluminum plate 23 which in turn is supported on brackets 24 secured to the rim of the lid. Said plate 23 is formed with notches 25 adapted to pass over the brackets 24 when the plate 23 may be turned so as to be supported by said brackets and in turn support said soapstone. While I have referred to the heat retaining filler as soapstone, it will be understood, of course, that any other substance adapted to the purpose may be used instead. The sides of the lid 21 are also perforated, the perforations corresponding to the perforations in the side of the casing 10. By this means air may be admitted from the outside in regulated quantities to maintain fire in the burner and continue the heat when and as desired. When it is desired to shut off the flame it is only necessary to rotate the lid 21 to close the openings shutting off the supply of air and consequently extinguishing the flame.

In the manufacture of this apparatus it is intended that it should be supplied with either one or both types of lids so that the user may thereby adapt the device for a larger variety of purposes.

It will also be understood that by making the apparatus of sufficient size it may be placed in a furnace and the heat therefrom utilized to heat a building through the medium of the furnace. These and a large variety of other uses will readily suggest themselves, as will many modifications in the construction and arrangement of parts, and I do not therefore desire to limit myself to the particular construction described except in so far as may be necessary by the terms of the claims.

Having thus fully described my said invention, what I claim as new and desire to secure by Letters Patent, is:

1. A heating device of the character described comprising a casing provided with a lid for inclosing the same, a burner mounted within said casing comprising a receptacle containing noncombustible absorbent liquid fuel containing material, a grate supported above said burner, a perforated plate below said burner, and noncombustible absorbent material between said perforated plate and the bottom of the casing, substantially as set forth.

2. A heating device comprising a casing, brackets formed about the inner periphery of the casing, a perforate plate having cut out notches proportioned to pass the brackets and to bear upon the bottom of the casing, a fuel absorbing member disposed upon the perforate plate, and a grate disposed over the fuel absorbing member and resting upon the brackets.

3. A heating device comprising a casing having fluid fuel absorbing material disposed in the bottom thereof, brackets formed about the inner periphery of the casing above the fluid fuel absorbing material, a perforate plate having notches formed in its periphery proportioned to pass over the brackets and to rest upon the fuel absorbing material, a fuel container disposed upon the perforate plate, and a grate disposed above the fuel container and bearing upon the brackets.

4. A heating device comprising a casing having perforate side walls, a grate support secured within the perforate walls, a grate disposed upon the support, a fuel container disposed within the casing beneath the grate, and a cover member slidable over and upon the casing and adapted to close the perforations thereof.

5. A heating device comprising a casing having perforate side walls and an imperforate bottom, a fuel container disposed within the casing and spaced from the side walls, a grate disposed above the fuel container and substantially flush with the upper edge of the side walls, and a dished cover member adapted to slidably fit upon the side walls and close the perforations.

6. A heating device comprising a casing having perforate side walls, a grate support secured within the perforate walls, a grate disposed upon the support, a fuel container disposed within the casing beneath the grate and a cover member slidable over and upon the casing and adapted to close the perforations thereof, said cover member being also provided with perforations positioned to register with the perforations in the walls at certain rotative relative positions.

In witness whereof I have hereunto set my hand and seal at Indianapolis, Indiana, this 29th day of May, A. D. nineteen hundred and nineteen.

OTIS W. NOTTINGHAM. [L. S.]

Witnesses:
E. W. BRADFORD,
M. L. SHULER.